United States Patent Office 3,410,946
Patented Nov. 12, 1968

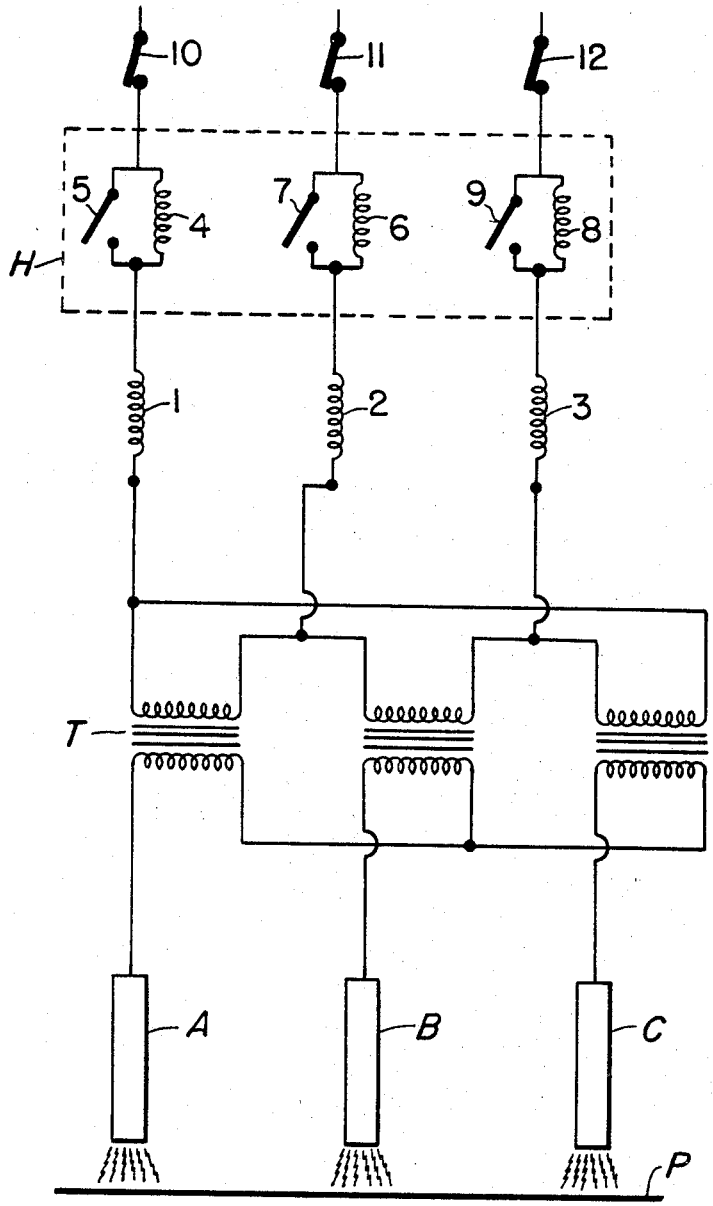

3,410,946
ALTERNATING CURRENT HOT TOPPING
Elmer D. Dilling, Toronto, Ohio, and Karl S. Snow, Boulder City, Nev., assignors to Titanium Metals Corporation of America, New York, N.Y., a corporation of Delaware
Filed Apr. 17, 1967, Ser. No. 631,495
9 Claims. (Cl. 13—9)

ABSTRACT OF THE DISCLOSURE

A method for maintaining a stable melting arc in alternating current melting of consumable electrodes during the end portion of the melt to gradually decrease the size of the molten pool formed at the upper end of the ingot and thereby eliminate or substantially reduce pipe and shrinkage voids in the upper end of the ingot comprising adding reactance to the power circuit to decrease the melting current applied to the electrodes during the end portion of the melt while retaining open circuit voltage for restriking the melting arc. Optionally, adding a metallic compound to the molten pool at spaced intervals during the end portion of the melt to further stabilize the melting arc.

SPECIFICATION

This invention relates to the hot topping of ingots formed from consumable electrodes by arc melting in a cold mold type furnace employing alternating current as melting power. More particularly, the invention is directed to a method for maintaining a stable arc during the hot topping phase of ingot formation.

Arc melting of consumable electrodes is a well known procedure for forming an ingot and is carried out by transferring molten metal from the electrodes into a crucible where the molten metal freezes to build up a solid ingot. During melting there is always a pool of molten metal above the solidified portion of the ingot; and at the end of the melt if the power is immediately shut off, shrinkage voids and pipe form in the upper portion of the ingot because the relatively rapid heat loss at the top of the pool causes the top to solidify leaving a pool of molten metal which solidifies more slowly than the top. The presence of shrinkage voids and pipe in the upper portion of the ingot necessitates removal of that portion with consequent decrease in yield which is economically undesirable. Hot topping of the ingot at the end of the melt eliminates or substantially reduces the shrinkage voids and pipe which result from relatively rapid cooling.

Effective hot topping in arc melting consumable electrodes ideally constitutes operating the melting arc with sufficient power to maintain the top of the pool molten and to melt enough additional metal to more than compensate for shrinkage which results in a slight buildup in the level of the molten pool. This requires less melting current than that supplied to the electrodes during the normal portion of the melt. In direct current arc melting of consumable electrodes, hot topping does not present a problem since a reduction in melting current can be readily accomplished by intermittently switching individual power supply units off the line. Switching individual units off the line decreases the melting current while permitting retention of high open circuit voltage for arc restrike if such is required during hot topping as the high voltage is maintained until the last unit is switched off. In alternating current melting the power supply will advantageously consist of a single unit for supplying full melting current, and the current required for hot topping could be obtained by reducing the transformer output voltage sufficiently to supply only the melting current required. However, the arc is relatively unstable in alternating current consumable electrode melting since the arc voltage passes through zero each time the cycle changes and must restrike as the voltage increases. For this reason high open circuit voltage must be retained when arc melting with alternating current, and such cannot be achieved if the transformer output voltage is reduced to obtain the lower melting current necessary for hot topping.

Our invention provides a novel method for hot topping an ingot melted from consumable electrodes with alternating current while retaining high open circuit voltage for restriking the arc. The method consists of adding reactance to the alternating current power circuit during the hot topping portion of the melt to lower the melting current while maintaining open circuit voltage. Additionally, the introduction of a metal compound in which the metal has a low electro-negativity and ionization potential to the pool of molten metal at the top of the ingot will be advantageous in certain instances during hot topping. It is especially important to maintain high open circuit voltage in consumable electrode arc melting furnaces operating under high vacuum since the arc is difficult to initiate under these conditions. A pool of molten metal of gradually decreasing size may be maintained throughout the hot top period by means of the method disclosed herein even in furnaces operating under high vacuum.

The method of our invention may be carried out in a furnace assembly as described in United States Patent No. 3,146,289 and may be used in conjunction with the arc melting method disclosed in U.S. Patent No. 3,239,592. The individual consumable electrodes may be sector shaped in horizontal cross section or may have other geometric configurations such as, for example, a diamond shape. Metals which may be arc melted as consumable electrodes in a furnace under vacuum and which are subject to hot topping in accordance with our invention include titanium, zirconium, vanadium, steel, the refractory metals and alloys of the foregoing as well as the so-called super alloys.

In accompanying drawing, we have shown a schematic diagram of the electrodes and the power circuit including the hot topping reactor for controlling the melting current supplies to the electrodes.

With reference to the drawing, three consumable electrodes A, B and C are shown depending downwardly above striker plate P which will be located in the bottom of a crucible positioned within the furnace (not shown). The upper end of each electrode is connected with the secondary of power transformer T. It should be understood that each electrode is mounted on an individually adjustable ram (not shown) for vertical movement relative to the molten pool formed at the top of the ingot. The primary of transformer T is connected with a primary reactor having coils 1, 2 and 3, and the primary reactor is in turn connected with hot top reactor H. The hot top reactor includes coils 4, 6 and 8 and shorting switches 5, 7 and 9. The power circuit is provided with switches 10, 11 and 12 which are opened to disconnect the circuit from the power source. The input voltage supplies to the primary of transformer T can be any convenient distribution voltage for which the transformer is designed. In the development of our method the input voltage was 13,800 volts.

When switches 10, 11 and 12 are closed and switches 5, 7 and 9 are open as shown in the drawing, current flows through coils 4, 6 and 8 and is thereby limited to the extent required for hot topping. Upon closing switches 5, 7 and 9, the current flows through the switches and the transformer will operate at full melting current. In both settings of the switches, the open circuit voltage is the same and restriking of the arc may, therefore, be readily effected.

While successful hot toping may be achieved by introducing reactance into the power circuit to facilitate restriking the arc, there are certain instances when the arc is not sufficiently stable even though open circuit voltage is supplied to the electrodes. In order to increase arc stability, we have found it advantageous to add a metal compound to the molten pool during hot topping. The metal of the compound should have a low electronegativity, preferably less than 1.5, and a low ionization potential, preferably below about 6 electron volts. Additionally, the melting point of the compound should preferably be above the melting point of the electrode metal, and the boiling point of the compound must be above the melting point of the electrode metal in order to allow a finite period in the arc zone. The metal compound should be selected so as not to contaminate the metal being melted. For example, $BaO_2$ may be used in the hot topping of steel but would contaminate titanium. The requirement that an arc stabilizing compound be introduced into the molten pool appears to depend to a large degree upon the presence of impurities or alloying elements in the electrode metal. For example, certain impurities, such as $MgCl_2$ and $NaCl$, in titanium electrodes and alloying elements, such as aluminum, in the ingot are believed to inherently act as arc stabilizers; and no addition is necessary for successful hot topping with low melting current and open circuit voltage obtained by introducing reactance into the power circuit. When using a metal compound to assist in arc stabilization, it will be added to the molten pool at intervals throughout the hot topping period.

The hot topping of ingots melted from consumable electrodes in a vacuum furnace by alternating current was initially attempted by interrupting the power supply to the electrodes at intervals during the end portion of the melt so that less melting power would be provided to the electrodes. This procedure was not successful as hot top melting was not continuous, and pipe resulted along the center line of the ingot. Additionally, interrupting the power supply is harmful to electrical equipment such as circuit breakers. Hot topping was also attempted by changing transformer taps during the end portion of the melt to decrease open circuit voltage. This was unsuccessful since the decreased voltage was insufficient for restriking the arc, and the resulting ingots contained considerable pipe. The loss from the ingot occasioned by pipe in ingots hot topped in accordance with the above mentioned methods varied from about 36% to about 45%. In addition to the severe ingot loss, excessively long and unstable arcs passed between the molten pool and the electrode carrying rams rather than the electrodes when the electrodes were close to maximum consumption and the surfaces of the rams were burned. The burned spots on the surfaces of the rams are rough; and when these rough surfaces contact the ram seals as the rams are withdrawn from the furnace, the seals are damaged so that it is subsequently difficult to obtain the tight fit necessary for maintaining a vacuum in the furnace.

The difficulties caused by arc instability are overcome by adding hot top reactor H to the power circuit, and hot topping at a lower melting current while retaining the initial open circuit voltage. For example, the addition of reactance to the power circuit by opening switches 5, 7 and 9 limited the melting current to about 4,000 amps per line as compared with the melting current of about 10,000 amps per line which was used during the normal portion of the melt in the 28 inch diameter furnace used in the development of our method. With the corresponding reactive voltage drop, furnace power is reduced from the 800 to 1000 kw. range to a range of about 300 to 400 kw. As will be appreciated by those skilled in the art, the current will be determined by furnace and electrode size and will inherently vary to a certain extent in accordance with such things as electrode material and furnace pressure. The number of turns in reactor H may be adjusted to maintain the hot topping current at the desired level.

The following non-limiting example illustrates a specific embodiment of our method in which a metal compound was used to enhance arc stabilization.

Example I

Three diamond-shaped consumable electrodes of stainless steel were arranged in the 28 inch furnace by attaching each electrode at its upper end to a vertically adjustable drive ram. The drive rams were individually adjustable by means of a screw type driving mechanism operated by a control circuit including an amplidyne responsive to changes in arc voltage and current. The alternating current power supply was connected to the electrodes in the manner shown in the drawings.

At the beginning of the melt, the electrodes were lowered into position above a striker plate located in the bottom of the crucible; and when the circuit was closed and the arc initiated, the electrodes melted into a molten pool in the bottom of the crucible. The furnace pressure was 20 microns of mercury absolute, and the normal portion of the melt lasted for 312 minutes. Melting current was obtained by a transformer tap setting providing about 57 volts phase to phase load voltage and about 35 volts arc voltage. The average melting current during the normal portion of the melt was 9,900 amps per line and the average melting power was 900 kilowatts. Potassium chloride pellets were continuously added to the furnace during the normal portion of the melt in order to maintain a stable arc in accordance with the procedure described in U.S. Patent No. 3,239,592.

After the 312th minute of the melt, hot top reactor switches 5, 7 and 9 were opened to add reactance to the power circuit and a 93 minute hot top was carried out. During the hot top, the average phase to phase load voltage was about 51 volts and the average arc voltage was about 29 volts. The melting power during the hot topping portion of the melt averaged about 350 kilowatts, and the melting current averaged 4,300 amps per line. The addition of barium oxide pellets about ⅜″ thick and about ⅜″ in diameter and weighing about two grams was initiated at the beginning of the hot top period, and additions were continued at three to five minute intervals during hot topping. The addition of potassium chloride pellets to the molten pool was continued during the hot topping period. A stable arc was maintained during hot topping, and no difficulty was encountered in maintaining a gradually decreasing pool of molten metal. The resulting ingot weighed 11,620 pounds, was 70 inches in length and contained no shrinkage voids or pipe.

The method of our invention permits successfully hot topping ingots formed from consumable electrodes with alternating current which was not possible prior to this time. The addition of the hot topping reactor to the power circuit makes it possible to reduce the melting current with no change in open circuit voltage to facilitate arc stabilization by providing high voltage for arc restrike when necessary. The addition of a metal compound to the pool of molten metal further increases arc stability.

While we have shown and described preferred embodiments of our invention, it is to be understood that it may be otherwise embodied within the scope of the appended claims.

We claim:
1. In a method of arc melting consumable electrodes of metal in a furnace by means of alternating current to form an ingot of said metal, including continuously melting a pool of molten metal from said electrodes by supplying alternating current to the electrodes from a power circuit to form said ingot, the improvement comprising adding reactance to the power circuit to decrease the melting current applied to said electrodes while retaining open circuit voltage for arc restrike during the end por- tion of the melt to stabilize the melting arc during said end portion of the melt and thereby permit said pool to gradually decrease in size.

2. In a method of arc melting as set forth in claim 1 adding a metal compound having a low electronegativity and a low ionization potential to said pool of molten metal at intervals throughout said end portion of the melt to increase arc stability.

3. In a method of arc melting as set forth in claim 2 wherein said metal compound is added in the form of pellets at intervals of about three to five minutes.

4. In a method of arc melting as set forth in claim 1 wherein said furnace is maintained under a vacuum.

5. In a method of arc melting as set forth in claim 1 wherein said end portion of the melt extends over a finite period up to about 1.5 hours.

6. In a method of arc melting as set forth in claim 1 wherein said melting current is about 4,000 amps per line during said end portion of the melt.

7. In a method of arc melting as set forth in claim 1 wherein said reactance is added to said power circuit to decrease melting current by opening short circuit switches in a hot top reactor in said power circuit to permit current to flow through coils in said hot top reactor.

8. In a method of arc melting as set forth in claim 1 adding barium oxide to said pool of molten metal at intervals throughout said end portion of the melt to increase arc stability.

9. In a method of arc melting as set forth in claim 8 wherein said barium oxide is added to said pool as pellets weighing about 2 grams at intervals of three to five minutes.

References Cited

UNITED STATES PATENTS

| | | | |
|---|---|---|---|
| 1,839,148 | 12/1931 | Greene | 13—12 |
| 1,937,696 | 12/1933 | Hanff | 13—12 X |
| 1,956,412 | 4/1934 | Christensen | 13—12 |
| 1,968,576 | 7/1934 | Suits | 13—12 |
| 2,599,179 | 6/1952 | Hopkins | 13—18 |
| 2,600,823 | 6/1952 | Zaccagnini | 13—18 |
| 2,758,144 | 8/1956 | Dreyfus | 13—12 |
| 2,877,339 | 3/1959 | Catlett | 219—135 |
| 3,193,758 | 7/1965 | Friedlander | 13—12 X |

BERNARD A. GILHEANY, *Primary Examiner.*

H. B. GILSON, *Assistant Examiner.*